US009652982B2

(12) United States Patent
Hegemann et al.

(10) Patent No.: US 9,652,982 B2
(45) Date of Patent: May 16, 2017

(54) METHOD AND SYSTEM FOR LEARNING TRAFFIC EVENTS, AND USE OF THE SYSTEM

(71) Applicant: Continental Teves AG & Co. oHG, Frankfurt (DE)

(72) Inventors: Stefan Hegemann, Wangen (DE); Ulrich Stählin, Eschborn (DE)

(73) Assignees: Continental Teves AG & Co. oHG, Frankfurt (DE); Conti Temic Microelectronic GmbH, Nürnberg (DE)

( * ) Notice: Subject to any disclaimer, the term of this patent is extended or adjusted under 35 U.S.C. 154(b) by 18 days.

(21) Appl. No.: 14/651,311

(22) PCT Filed: Dec. 20, 2013

(86) PCT No.: PCT/EP2013/077655
§ 371 (c)(1),
(2) Date: Jun. 11, 2015

(87) PCT Pub. No.: WO2014/096345
PCT Pub. Date: Jun. 26, 2014

(65) Prior Publication Data

US 2015/0317901 A1 Nov. 5, 2015

(30) Foreign Application Priority Data

Dec. 21, 2012 (DE) ........................ 10 2012 025 159

(51) Int. Cl.
*G06F 19/00* (2011.01)
*G06G 7/76* (2006.01)
(Continued)

(52) U.S. Cl.
CPC ......... *G08G 1/0112* (2013.01); *G08G 1/0133* (2013.01); *G08G 1/0141* (2013.01)

(58) Field of Classification Search
USPC .................................................. 701/117, 400
See application file for complete search history.

(56) References Cited

U.S. PATENT DOCUMENTS 7,557,730 B2 * 7/2009 Gueziec ............. G01C 21/3492 340/905
8,179,281 B2 5/2012 Strauss
(Continued)

FOREIGN PATENT DOCUMENTS

DE 102007048809 7/2008
DE 102008012660 12/2008
(Continued)

OTHER PUBLICATIONS

Ando et al., "Performance of Pheromone Model for Predicting Traffic Congestion,"Dec. 5, 2006, pp. 73-80.
(Continued)

*Primary Examiner* — Ronnie Mancho
(74) *Attorney, Agent, or Firm* — RatnerPrestia

(57) ABSTRACT

A method for learning traffic events, the traffic events being transmitted to a data network using vehicle-to-X communication. The traffic events include position data and time data assigned to the traffic events, and the traffic events are stored electronically in the data network. The method is characterized in that an individual storage duration is determined for each traffic event, and the traffic event is deleted from the data network after the storage duration expires. The invention further relates to a corresponding system and to the use thereof.

15 Claims, 3 Drawing Sheets

(51) Int. Cl.

| | |
|---|---|
| ***G06F 7/70*** | (2006.01) |
| ***G08G 1/00*** | (2006.01) |
| ***G08G 1/01*** | (2006.01) |

(56) References Cited

U.S. PATENT DOCUMENTS

| | | | | |
|---|---|---|---|---|
| 8,354,942 | B2 | 1/2013 | Stahlin | |
| 8,410,956 | B2 | 4/2013 | Bai | |
| 8,781,733 | B2 | 7/2014 | Staehlin | |
| 8,831,869 | B2 | 9/2014 | Bai | |
| 2006/0092043 | A1* | 5/2006 | Lagassey | G07C 5/008 340/907 |
| 2006/0095199 | A1* | 5/2006 | Lagassey | G07C 5/008 701/117 |
| 2006/0178788 | A1 | 8/2006 | Sasaki | |
| 2008/0039113 | A1* | 2/2008 | Liu | G08G 1/093 455/456.1 |
| 2008/0270363 | A1* | 10/2008 | Hunt | G06F 17/30489 |

FOREIGN PATENT DOCUMENTS

| | | |
|---|---|---|
| DE | 102008038829 | 4/2009 |
| DE | 102009008959 | 9/2009 |
| DE | 102010012402 | 12/2010 |
| EP | 1286507 | 2/2003 |
| WO | 2009149730 | 12/2009 |

OTHER PUBLICATIONS

Car 2 Car Communications Consortium, “Car 2 Car Communication Consortium Manifesto; Overview of the C2C-CC System; Version 1.1,” Aug. 28, 2007, pp. 1-94.

German Search Report mailed Jul. 2, 2013 for German Application No. 10 2012 025 159.9, including partial translation.

International Search Report for International Application No. PCT/EP2013/077655 mailed Mar. 24, 2014.

* cited by examiner

METHOD AND SYSTEM FOR LEARNING TRAFFIC EVENTS, AND USE OF THE SYSTEM

CROSS REFERENCE TO RELATED APPLICATIONS

This application is the U.S. National Phase Application of PCT/EP2013/077655, filed Dec. 20, 2103, which claims priority to German Patent Application No. 10 2012 025 159.9, filed Dec. 21, 2012, the contents of such applications being incorporated by reference herein.

FIELD OF THE INVENTION

The invention relates to a method for learning traffic events, a system for learning traffic events, and use thereof.

BACKGROUND OF THE INVENTION

Different generic types of driver assistance systems are known in the prior art which share the common characteristics that they serve to relieve the strain on the driver and increase safety in traffic events. Systems of this type are partially based on environment information detected by means of environment sensor systems, on information read out from digital map material or on information that has been received by means of vehicle-to-X communication. Similarly, navigation systems, which are normally designed as GPS-based systems, are also known and are fitted as standard in more and more current vehicles. These navigation systems perform a location determination on the basis of received satellite signals and guide the driver along a specific travel route to the destination with the aid of digital map material.

A method for recognizing concealed objects in road traffic is known from DE 10 2007 048 809 A1, which is incorporated by reference. The environment of a vehicle and movement parameters of the vehicle are detected by sensors. This information is transmitted by means of vehicle-to-vehicle communication to further vehicles located in the environment. Similarly, the further vehicles located in the environment simultaneously detect and transmit environment information and movement information. This information is received and is used to extend an existing environment model. The environment model extended in this way is played back in updated form by means of a display and can be made available to a plurality of driver assistance systems. Information relating to objects that cannot be detected by the vehicle sensors themselves is thus available in the vehicle.

A vehicle system for navigation and/or driver assistance is described in DE 10 2009 008 959 A1, which is incorporated by reference. The vehicle system comprises a provider unit, at least one environment sensor and one vehicle sensor. The provider unit in turn comprises a position model based on a satellite signal sensor and an ADAS horizon provider which can have a communication link to a navigation unit which can also be located outside the vehicle. The navigation unit can be designed e.g. as a server which transfers map extracts of a digital map to the provider unit.

DE 10 2008 012 660 A1, which is incorporated by reference, discloses a method for the server-based warning of vehicles against hazards and a corresponding hazard warning unit. A measurement value is detected by means of a detection unit of a first vehicle and it is determined whether the measurement value corresponds to a hazard. If the measurement value corresponds to a hazard, information data relating to the hazard are transmitted to a central unit. The type of hazard, the location at which the measurement value was detected, the time at which the measurement value was detected and an identification of the transmitting vehicle are stored in the central unit and corresponding warning data are generated. The warning data relevant to a second vehicle can then be retrieved by this second vehicle from the central unit.

However, the methods and systems known in the prior art suffer from disadvantages insofar as information and environment models stored in a database or in a memory are rigidly retained and made available to vehicles until they have been refuted or revised by a sufficient number of more up-to-date measurements. A flexible handling of the stored information and environment models taking account of the dynamics of the traffic flow is therefore not possible, and, in particular, a recognition of regularly occurring traffic events at specific traffic sections is not possible.

SUMMARY OF THE INVENTION

An aspect of the present invention proposes a method which overcomes the disadvantages prevailing in the prior art.

With the method according to an aspect of the invention for learning traffic events, in which the traffic events are transmitted by means of vehicle-to-X communication to a data network and wherein the traffic events comprise position data and time data assigned to the traffic events, the traffic events are retained electronically in the data network. The method is characterized in that an individual retention period is defined for each traffic event and the traffic event is deleted from the data network when the retention period expires.

This offers the advantage that the traffic events are deleted automatically from the data network when the individual retention period expires, wherein the individual retention period is advantageously selected to match the respective traffic event. For example, the “Congestion” traffic event can be deleted from the data network more quickly than the “Slippery road” traffic event, since congestion normally clears within a few hours, whereas a slippery road is weather-dependent and may persist comparatively longer, particularly in the absence of a gritting service.

The method according to an aspect of the invention thus corresponds to a “learning” and a subsequent “forgetting” of traffic events, which enables an intelligent and event-oriented retention of the individual traffic events.

The term “traffic event” is used within the meaning of the invention to refer not exclusively to the traffic event as such, but in particular to the information describing the traffic event.

The position data are preferably determined by means of a global satellite navigation system, such as e.g. GPS or Galileo, preferably supplemented by a map-matching method or dead reckoning.

The time data are advantageously determined via a clock of the data network and are assigned to the traffic events when the latter are transmitted to the data network.

It is advantageously provided that the vehicle-to-X communication is carried out by means of at least one of the following connection types:

- WLAN connection, in particular according to IEEE 802.11p,
- WiFi connection,
- ISM connection (Industrial, Scientific, Medical Band), in particular via a radio-link-enabled locking device, Bluetooth connection,
ZigBee connection,
UWB connection (Ultra Wide Band),
WiMax connection (Worldwide Interoperability for Microwave Access),
Remote Keyless Entry connection,
Mobile radio connection, in particular GSM, GPRS, EDGE, UMTS and/or LTE connection, and
infrared connection.

These connection types offer different advantages, depending on the type, wavelength and data protocol used. Some of the aforementioned connection types thus enable e.g. a comparatively high data transmission rate and a comparatively fast connection set-up, whereas others are highly suitable to the greatest possible extent for data transmission around visibility obstructions. Further advantages can be gained through the combination and simultaneous or parallel use of a plurality of these connection types, since disadvantages of individual connection types can also be cancelled out in this way.

It is preferably provided that the traffic events describe hazard situations and the retention period is determined according to a hazard factor and/or a frequency of the traffic event, wherein the retention period increases with increasing frequency and with an increasing hazard factor. This first of all offers the advantage that the number of retained traffic events remains restricted, since it is reduced to hazard situations. Nevertheless, a loss of relevant information or traffic events does not essentially occur since the comparatively most significant traffic events are, as a general rule, hazard situations. Examples of traffic events of this type which describe a hazard situation include such things as the “Slippery road”, “Congestion”, “Accident”, “Road works”, “Road narrows” and “Breakdown vehicle” events. The traffic events can also describe special events depending on the season or time of day, such as e.g. “Slippery road due to fallen leaves” in the fall and “Glare hazard due to sunrise or sunset” at dawn or dusk.

The more often a specific traffic event occurs and is transmitted to the data network, i.e. the greater the frequency of the traffic event, the longer the respective retention period will be. Since the frequency of a traffic event increases with each transmission to the data network, the associated retention period is also redefined, i.e. prolonged, with each transmission. This clearly corresponds to a “learn and forget process” by the data network which can, in a manner of speaking, remember more frequently occurring traffic events for a longer period than comparatively infrequently occurring traffic events. This offers the advantage that comparatively frequently occurring traffic events are retained for a longer period and information relating to these traffic events is therefore available for a longer period. The retention period can be made both linearly dependent and progressively dependent on the frequency, i.e. a specific retention period is assigned to a specific frequency interval. If the frequency of a specific traffic event is so great that the associated individual retention period is prolonged more quickly than it expires, this traffic event will consequently be permanently retained.

Since the retention period is furthermore dependent on a hazard factor and similarly increases with an increasing hazard factor, this offers the further advantage that traffic events which represent a comparatively major hazard are retained for a longer period than traffic events which represent only a minor hazard. The hazard factor can be defined e.g. by means of a predefined table which assigns a hazard factor to each type of traffic event. Alternatively or additionally, the already defined hazard factor can be transmitted together with the traffic event to the data network.

Finally, the retention period of specific traffic events is therefore continuously prolonged if said traffic events occur frequently enough and have a corresponding hazard factor. One such example is the ends of traffic tailbacks regularly occurring at peak traffic times behind the brows of hills or blind bends which normally present a comparatively substantial hazard and therefore have a comparatively high hazard factor.

It is furthermore preferable that a traffic event is not deleted if it describes a road traffic accident. Since a road traffic accident is the consequence of a hazard that can no longer be averted and is therefore extremely relevant to the motoring environment and the safety of road users, it is therefore ensured that the information relating to the road traffic accident is available at all times. This can be done, for example, by assigning an infinitely long retention period to the “road traffic accident” traffic event.

It is furthermore preferable that electronically retained traffic events of the same type, the position data and/or time data of which are not separated from one another by more than a spatial and/or temporal limit value, are combined to form a cumulated traffic event. This offers the advantage, on the one hand, that the method according to the invention is simplified, since there is no need to retain a comparatively large number of individual, virtually identical traffic events and a correspondingly large data volume. On the other hand, this offers the advantage that the frequency of the cumulated traffic events can be used to define the retention period, as a result of which a retention period becoming more appropriate to the actual frequency can be defined. One such example is the occurrence of a slippery road due to road ice formation on a specific road section, wherein the slippery road has been detected at different places in each case several meters apart from one another and has been transmitted accordingly to the data network. The combination of these individual traffic events of the same type to form a cumulated traffic event therefore offers the advantage that the frequency of the cumulated traffic event is significantly greater compared with the individual frequencies of the individual traffic events, resulting in a comparatively longer retention period. This longer retention period corresponds more closely to the actual traffic situation since it can be assumed in reality that ice has formed over the entire road section. The exact place where the road ice formation has been recognized is irrelevant in practice.

Within the meaning of the invention, traffic events are regarded as traffic events of the same type if they describe an identical situation, such as e.g. “Slippery road”, “Congestion” or “Road works”.

It is appropriately provided that the data network is a decentralized data network which comprises local network elements along a multiplicity of traffic routes. This offers the advantage that the data volumes generated by the transmission of traffic events to the data network can be distributed among the local network elements. Furthermore, the local network elements are also readily contactable at all times by means of comparatively short-range connection types of the vehicle-to-X communication.

It is appropriately provided in particular that the traffic events are retained by the network elements which are located within a predefined distance from position data assigned to the traffic events. For this purpose, the network elements can have suitable local electronic databases. The respective traffic events are thus retained close to the position data at which they have occurred. This makes it possible to avoid the transmission of comparatively large data volumes within the data network also, since the traffic events, for example, no longer need to be transmitted to a central database and, where appropriate, retrieved once more from said database. Furthermore, the traffic events are available directly in the vicinity of the position data at which they have occurred.

It is advantageously provided that the traffic events are detected by a multiplicity of vehicles by means of environment sensor systems and/or driving state sensors and are transmitted to the data network. This offers the advantage that the traffic events are detected directly by the road users involved in the traffic events. All relevant traffic events are thus normally reliably detected in a comparatively simple manner.

In particular, it is provided that the traffic events are detected by means of one of the following environment sensors or driving state sensors:

radar sensor,
optical camera sensor,
lidar sensor,
laser sensor,
ultrasound sensor,
chassis sensor,
ESP sensor,
ABS sensor, and
inclination sensor.

The aforementioned sensors are sensors typically used in the automotive sector which essentially enable a comprehensive detection and recognition of the vehicle environment and the vehicle state. At the present time, a multiplicity of vehicles are equipped as standard with a plurality of sensors of the aforementioned generic types and, in all likelihood, this number will further increase in future. The additional equipment overhead for implementing the method according to the invention in a motor vehicle is therefore low.

It is furthermore provided that the electronically retained traffic events and/or the cumulated traffic events are transmitted by means of vehicle-to-X communication to a vehicle if the vehicle comes within the predefinable distance to the position data assigned to the traffic events. This offers the advantage that, as soon as the vehicle has moved sufficiently close to the position data of the respective traffic event, it receives information relating to this respective traffic event. Since the traffic events normally entail hazard situations, the vehicle therefore receives information interpretable as a warning in a timely manner before reaching the position from which the hazard situation originates or originated. This information may, for example, be transmitted by means of a short-range connection type as a broadcast, as a result of which, in this case, the predefinable distance limit within which the transmission takes place is also defined by the transmission range.

Similarly, the vehicle can transmit its position data to the data network continuously or regularly, whereupon said data network then transmits the corresponding traffic events to the vehicle. Alternatively, the data network can mark the retained traffic events using the position data allocated to them so that said position data can be retrieved by the vehicle as soon as it comes within the predefinable distance. In principle, all conventional and known so-called push and pull methods are suitable here for the transmission.

The vehicle and the driver of the vehicle thus receive information relating to traffic events based on a detection by other vehicles. Due to the multiplicity of vehicles which detect the traffic events, the traffic events transmitted according to the invention from the data network to the vehicle are correspondingly more reliable and, where relevant, statistically more strongly corroborated than information which is detected by only a few or even individual vehicles and is exchanged between said vehicles by means of vehicle-to-X communication.

Moreover, the vehicles and their drivers thus receive information on traffic events even if no other vehicles are in the environment or within transmission range.

It is furthermore provided that the network elements are mobile radio masts and/or traffic lights and/or traffic signs and/or beacons and/or marker posts and/or bridges and/or weather stations and/or separate infrastructure facilities. Existing infrastructure elements can therefore be used as network elements, as a result of which the costs incurred in setting up the data network can be kept low. If the infrastructure elements are not enabled for vehicle-to-X communication, their functionality must, where relevant, be extended. An extension of the aforementioned infrastructure elements by a local electronic database for the local retention of traffic events may also be necessary.

According to an aspect of the invention, the separate infrastructure facilities are special network elements provided exclusively to carry out the method according to the invention and performing no further function.

It is preferably provided that the traffic events are retained centrally and are retrievable via a database, and, in particular, are retrievable for route planning for vehicles. An up-to-date overall picture of all detected traffic events is thus retained in the database. This overall picture can be used either as a backup copy in the event of data loss in one or more network elements, or to evaluate larger route sections in terms of specific traffic events. Particular advantages are furthermore gained through the use of the central database for route planning for vehicles. To do this, the traffic events retained in the database may, for example, be retrievable by the respective vehicles. In the route planning, this enables e.g. the consideration of criteria such as "Avoidance of routes with increased risk of slippery roads" or "Avoidance of routes with increased risk of congestion". A further possible use of is the database consists in determining in each case optimum, particularly environment-friendly or particularly fast routes.

It is furthermore preferable to check the plausibility of traffic events transmitted to the database by means of traffic events retained in the database before said traffic events are transmitted from the data network to the vehicle. This offers the advantage that only traffic events that can be assumed to be confirmed are transmitted to the vehicle. For example, a traffic event transmitted to the database can be assumed to be plausible if a specific number of traffic events of the same type with essentially identical position data are transmitted to the database in a specific time period. Or, for example, the "Slippery road" traffic event can be assumed to be plausible more quickly in a road section with a known risk of slippery conditions than in a different road section. A multiplicity of plausibility-checking methods for vehicle-to-X messages that are already known in the context of vehicle-to-X communication are generally suitable for the plausibility check according to the invention.

It is appropriately provided that traffic events detected by each of the multiplicity of vehicles are additionally retained electronically in each of the multiplicity of vehicles. These traffic events retained locally in the multiplicity of vehicles are naturally less comprehensive than the traffic events retained in the data network, but provide a useful supplement to the latter. In particular, a confirmation or validation of the traffic events through matching of the traffic events retained in each of the multiplicity of vehicles with the traffic events retained in the data network is possible. A plausibility check on the traffic events transmitted from the data network can furthermore be carried out in each of the multiplicity of vehicles by means of said vehicle's environment sensor system or driving state sensor system.

By analogy with the method in the data network, an individual retention period can also be defined in each of the multiplicity of vehicles for each traffic event, wherein the traffic event can be deleted from a corresponding electronic memory or an electronic database in each of the multiplicity of vehicles when the retention period expires.

An aspect of the invention furthermore relates to a system for learning traffic events which comprises at least one electronic database, a multiplicity of vehicles which are equipped with vehicle-to-X communication means and with an environment sensor system and/or a driving state sensor system, and also a multiplicity of network elements of a data network which are arranged along a multiplicity of traffic routes and are equipped with vehicle-to-X communication means, wherein the multiplicity of vehicles detect traffic events by means of the environment sensor system and/or the driving state sensor system and transmit them by means of the vehicle-to-X communication means to the data network, wherein the traffic events comprise position data and time data assigned to the traffic events and wherein the at least one electronic database retains the traffic events electronically. The system is characterized in that evaluation means of the at least one electronic database define an individual retention period for each traffic event and that memory deletion means delete the traffic event from the at least one electronic database when the retention period expires. The system according to the invention thus comprises all necessary means for carrying out the method according to the invention and therefore enables the learning of traffic events in an efficient manner.

It is preferably provided that the system carries out the method according to the invention. This offers the advantages already described.

An aspect of the invention furthermore relates to a use of the system according to the invention for hazard warning in road traffic.

BRIEF DESCRIPTION OF THE DRAWINGS

Further preferred embodiments are presented in the subclaims and the following descriptions of example embodiments with reference to figures.

In the figures.

DETAILED DESCRIPTION OF THE INVENTION

Figure 1:
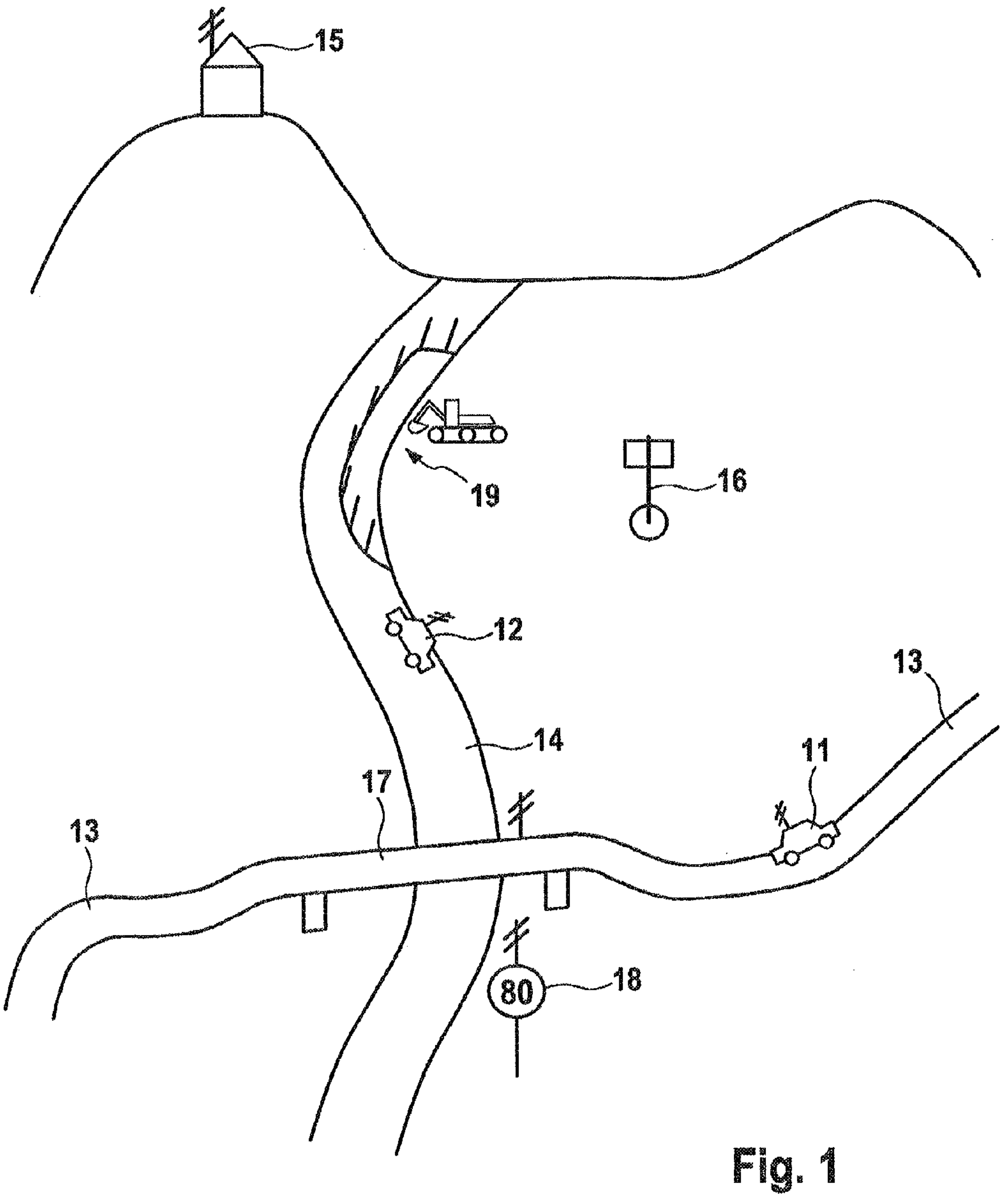
FIG. 1 shows an example of the system according to the invention.

FIG. 1 shows an example of a structure of the system according to an aspect of the invention. Vehicles 11 and 12 are shown which are in each case enabled for vehicle-to-X communication and are travelling on traffic routes 13 and 14. Vehicles 11 and 12 are equipped in each case with environment and driving state sensor systems for detecting traffic events. A weather station 15, a mobile radio mast 16, a bridge 17 and a traffic sign 18 are also shown which, along with their actual traffic-related technical function, in each case serve as network elements of the data network according to the invention. For this purpose, network elements 15, 16, 17 and 18 are in each case equipped with vehicle-to-X communication means and local electronic databases. For example, the bridge 17 and the traffic sign 18 are enabled for vehicle-to-X communication exclusively by means of WLAN according to IEEE 802.11p, whereas the mobile radio masts 16 and weather station 15 are enabled for vehicle-to-X communication exclusively by means of mobile radio. When travelling on the traffic route 14, the vehicle 12, by means of its environment sensor system, detects the road works 19 which represent a hazard situation and are understood as a traffic event within the meaning of the invention. The vehicle 12 transmits this traffic event by means of mobile radio to the weather station 15 and the mobile radio mast 16 and also by means of WLAN to the bridge 17, which is just within the transmission range. The transmitted traffic event furthermore comprises position data in the form of GPS coordinates and time data, wherein the position data describe the location of the vehicle 12 at the time of detection of the road works 19 and the time data describe the time of detection of the road works 19. The weather station 15, the mobile radio mast 16 and the bridge 17 store the transmitted traffic event in each case in a local electronic database and retain it for a definable retention period. During the retention period, the traffic event can be transmitted to and made available to other vehicles which are travelling on the traffic route 14. The retention period is read from a table which assigns a hazard factor to each type of traffic event. The weather station 15, the mobile radio mast 16 and the bridge 17 in each case define an individual retention period on the basis of this hazard factor and the frequency with which the "Road works 19" traffic event is transmitted to the weather station 15, the mobile radio mast 16 and the bridge 17. Since the weather station 15, the mobile radio mast 16 and the bridge 17 access the same table, they in each case define an identical individual retention period. For example, the present retention period is two days. Insofar as the "Road works 19" traffic event is not retransmitted to the weather station 15, the mobile radio mast 16 or the bridge 17 within the retention period, it is deleted from their electronic databases, since it is assumed that the road works 19 are no longer present. This clearly corresponds to a "forgetting" of the road works 19 in network elements 15, 16 and 17.

Figure 2:
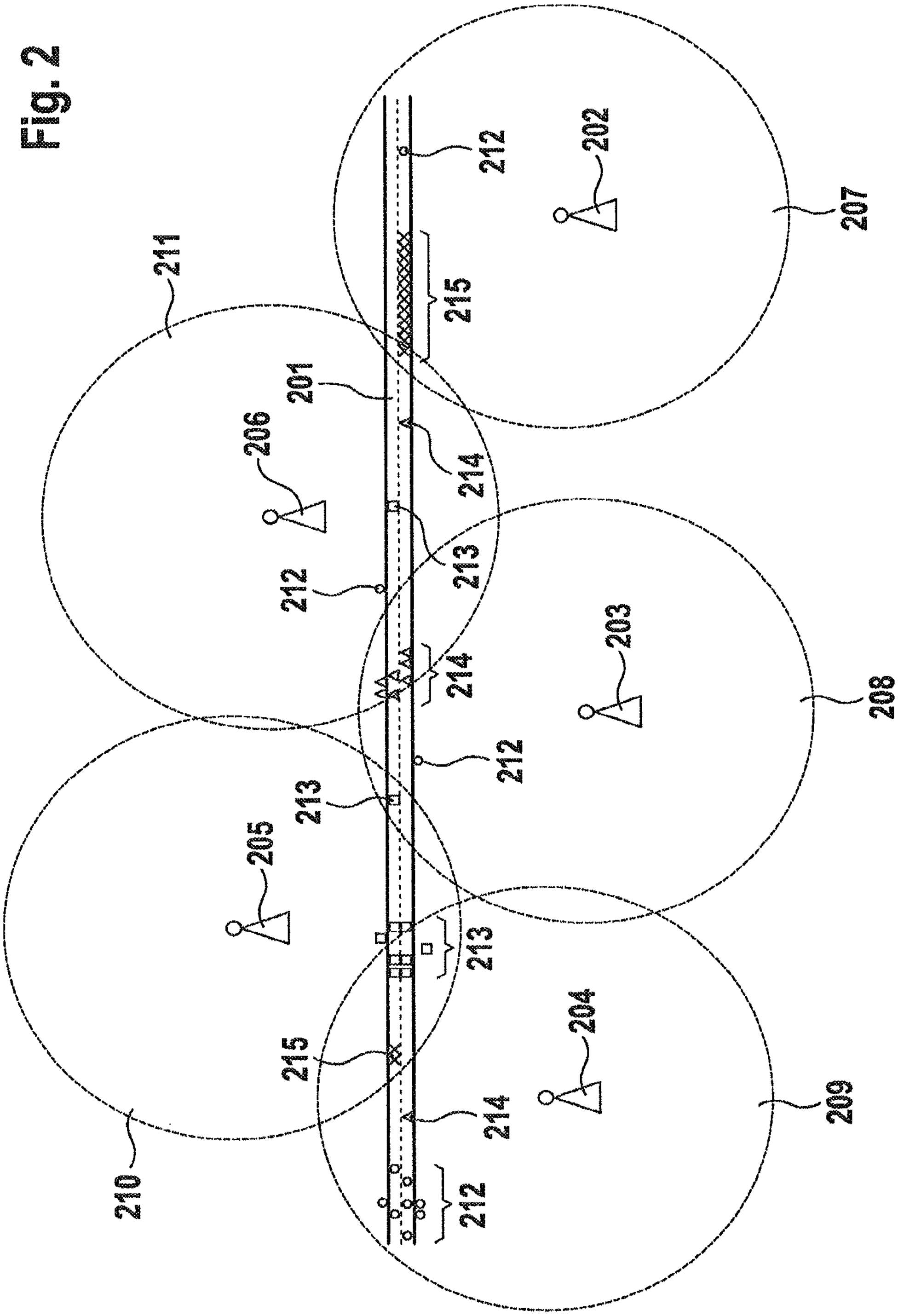
FIG. 2 shows schematically an arrangement of network elements along a traffic route.

FIG. 2 shows a road section 201 with network elements 202, 203, 204, 205 and 206. The network elements 202, 203, 204, 205 and 206 are, for example, designed as infrastructure facilities with no further traffic-related technical function which are provided specifically for the method according to the invention and are in each case enabled for vehicle-to-X communication by means of WLAN according to IEEE 802.11p. Transmission ranges 207, 208, 209, 210 and 211 are assigned to the network elements 202, 203, 204, 205 and 206. As can be seen, the transmission ranges 207, 208, 209, 210 and 211 completely cover the traffic route 201. Traffic events 212, 213, 214 and 215 are retained in the local electronic databases of network elements 202, 203, 204, 205 and 206. The traffic events 212 describe accident events, the traffic events 213 describe the occurrence of slippery road conditions in the form of black ice, the traffic events 214 describe potholes and the traffic events 215 describe traffic congestion. Since these traffic events are transmitted to a vehicle travelling along the traffic route 201, the vehicle is provided with up-to-date warning information relating to possible hazard situations.

Figure 3:
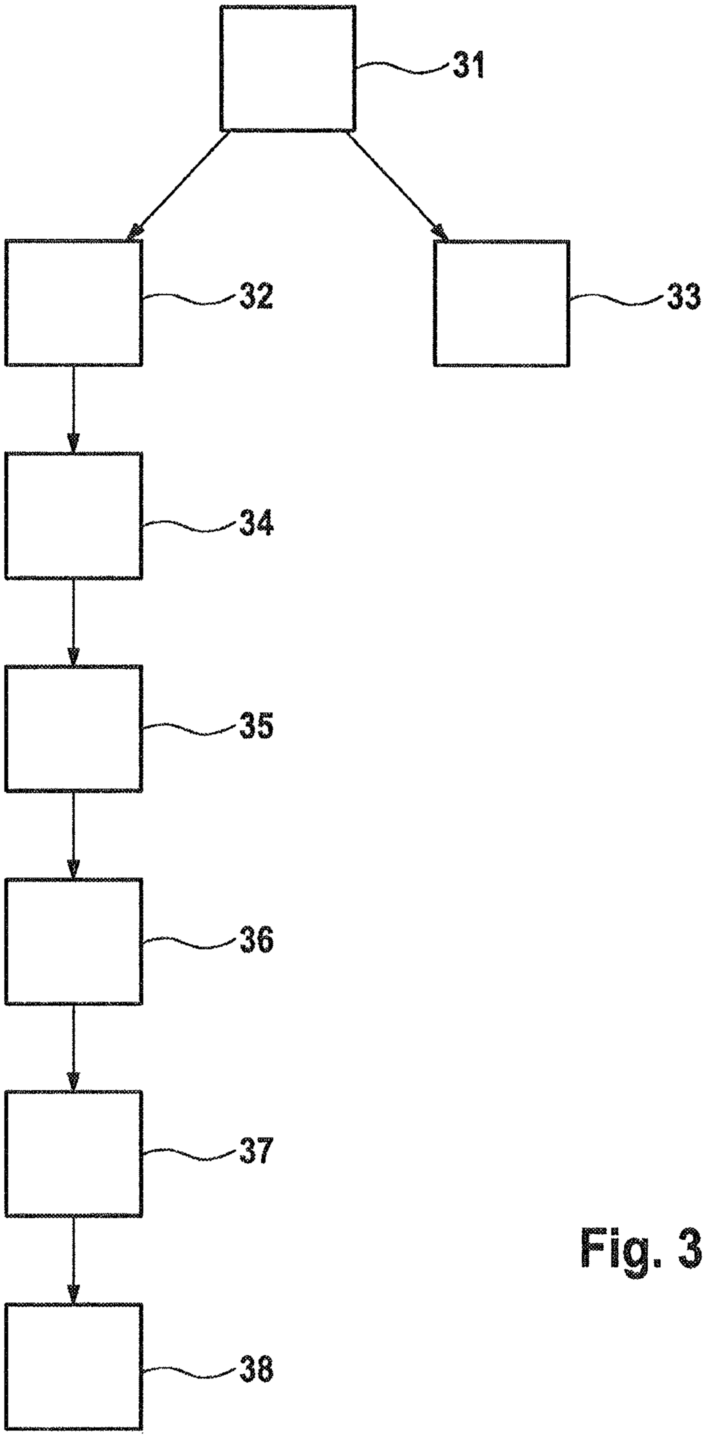
FIG. 3 shows an example of the sequence of the method according to the invention in the form of a flow diagram.

FIG. 3 shows a possible sequence of the method according to the invention in the form of a flow diagram. In step 31, traffic events are detected by a vehicle by means of an environment sensor system and a driving state sensor system. In step 32, these traffic events are transmitted to a data network according to the invention and are written to an internal vehicle memory in the simultaneous step 33. The traffic events comprise position data and time data. In step 34, the traffic events are written to an electronic database of the data network and are retained therein. Step 34 also comprises the assignment of new time data to the transmitted traffic events, wherein the new time data originate from an internal clock of the data network. This guarantees a uniform marking of the traffic events with time data, since the time data therefore always originate from the same clock. In method step 35, an individual retention period is assigned to the traffic events by means of evaluation means, said time period first being read from a table for each specific traffic event and being modified in step 36 depending on the frequency of the specific traffic events. The more frequently a specific traffic event occurs and is transmitted to the data network, the further the retention period is prolonged. In step 37, the traffic events are transmitted to a vehicle which is travelling along a traffic route assigned to the traffic events. Finally, in the last method step 38, the traffic events of which the retention period has expired are deleted from the data network.

The invention claimed is:

1. A method for learning traffic events, in which the traffic events are transmitted by vehicle-to-X communication to a data network, the method comprising:

- detecting, by a vehicle, the traffic events,
- assigning, by the vehicle, position data and time data to the traffic events,
- transmitting, by the vehicle, the traffic events to network elements of the data network located along a traffic route at a distance from the vehicle,
- storing electronically, by the data network, the traffic events,
- defining, by the data network, an individual retention period for each of the traffic events,
- prolonging, by the data network, the retention period for each of the respective traffic events when the respective traffic events are re-transmitted to the data network, and
- deleting, by the data network, each of the respective traffic events when the respective retention period expires.

2. The method as claimed in claim 1, wherein the traffic events describe hazard situations and the retention period is defined depending on a hazard factor and/or a frequency of the traffic event, wherein the retention period increases with increasing frequency and with an increasing hazard factor.

3. The method as claimed in claim 1, wherein a traffic event of the traffic events is not deleted if it describes a traffic accident.

4. The method as claimed in claim 1, wherein in response to the electronically retained traffic events being of the same type, the position data and/or time data of the traffic events which are not separated from one another by more than a spatial and/or temporal limit value, are combined to form a cumulated traffic event.

5. The method as claimed in claim 1, wherein the data network is a decentralized data network which comprises local network elements along a multiplicity of traffic routes.

6. The method as claimed in claim 5, wherein the traffic events are retained by the network elements which are located within a predefinable distance from the traffic events.

7. The method as claimed in claim 1, wherein the traffic events are detected by a respective environment sensor, system and/or a driving state sensor system of a plurality of vehicles, and are transmitted to the data network.

8. The method as claimed in claim 4, wherein the electronically re tamed traffic events and/or cumulated traffic events are transmitted by vehicle-to-X communication to a vehicle if the vehicle comes within the predefinable distance to the traffic events.

9. The method as claimed in claim 5, wherein the network elements are mobile radio masts and/or traffic lights and/or traffic signs and/or beacons and/or marker posts and/or bridges and/or weather stations and/or separate infrastructure facilities that communicate with the vehicle.

10. The method as claimed in claim 1, wherein the traffic events are centrally retained and are retrievable via a database, and also, are retrievable for route planning for vehicles.

11. The method as claimed in claim 1, wherein a plausibility of traffic events transmitted to the network is compared to traffic events retained in the data network before said traffic events are transmitted from the data network to the vehicle.

12. The method as claimed in claim 10, wherein traffic events detected by sensors of each of a multiplicity of vehicles are additionally retained electronically in each of the multiplicity of vehicles.

13. A system for learning traffic events, comprising:

- at least one electronic database,
- a multiplicity of vehicles which are each equipped with vehicle-to-X communication and with at least one of an environment sensor system and a driving state sensor system, and
- a multiplicity of network elements of a data network which are arranged along a multiplicity of traffic routes at a distance from at least one of the multiplicity of vehicles and are equipped with vehicle-to-X communication,
- wherein the multiplicity of vehicles detect the traffic events by at least one of the environment sensor system and the driving state sensor system and transmit them by the vehicle-to-X communication to the data network,
- wherein the traffic events comprise position data and time data assigned to the traffic events,
- wherein the at least one electronic database retains the traffic events electronically,
- wherein the at least one electronic database:
  - defines an individual retention period for each of the traffic events,
  - prolongs the individual retention period for each of the respective traffic events when the respective traffic events are re-transmitted to the data network, and
  - deletes each of the traffic events from the at least one electronic database when the retention period expires.

14. The system as claimed in claim 13, wherein the system carries out a method for learning the traffic events, in which the traffic events are transmitted by vehicle-to-X communication to a data network, wherein the traffic events comprise position data and time data assigned to the traffic events and wherein the traffic events are retained electronically in the data network, wherein an individual retention period is defined for each of the traffic events and each of the traffic events is deleted from the data network when the retention period expires.

15. The method as claimed in claim 2, further comprising: preventing the traffic event from being deleted if it describes a traffic accident.

* * * * *